H. H. LARKINS & M. R. KEVIL.
AGRICULTURAL MACHINE.
APPLICATION FILED JAN. 6, 1915.
1,153,800.
Patented Sept. 14, 1915.
4 SHEETS—SHEET 1.
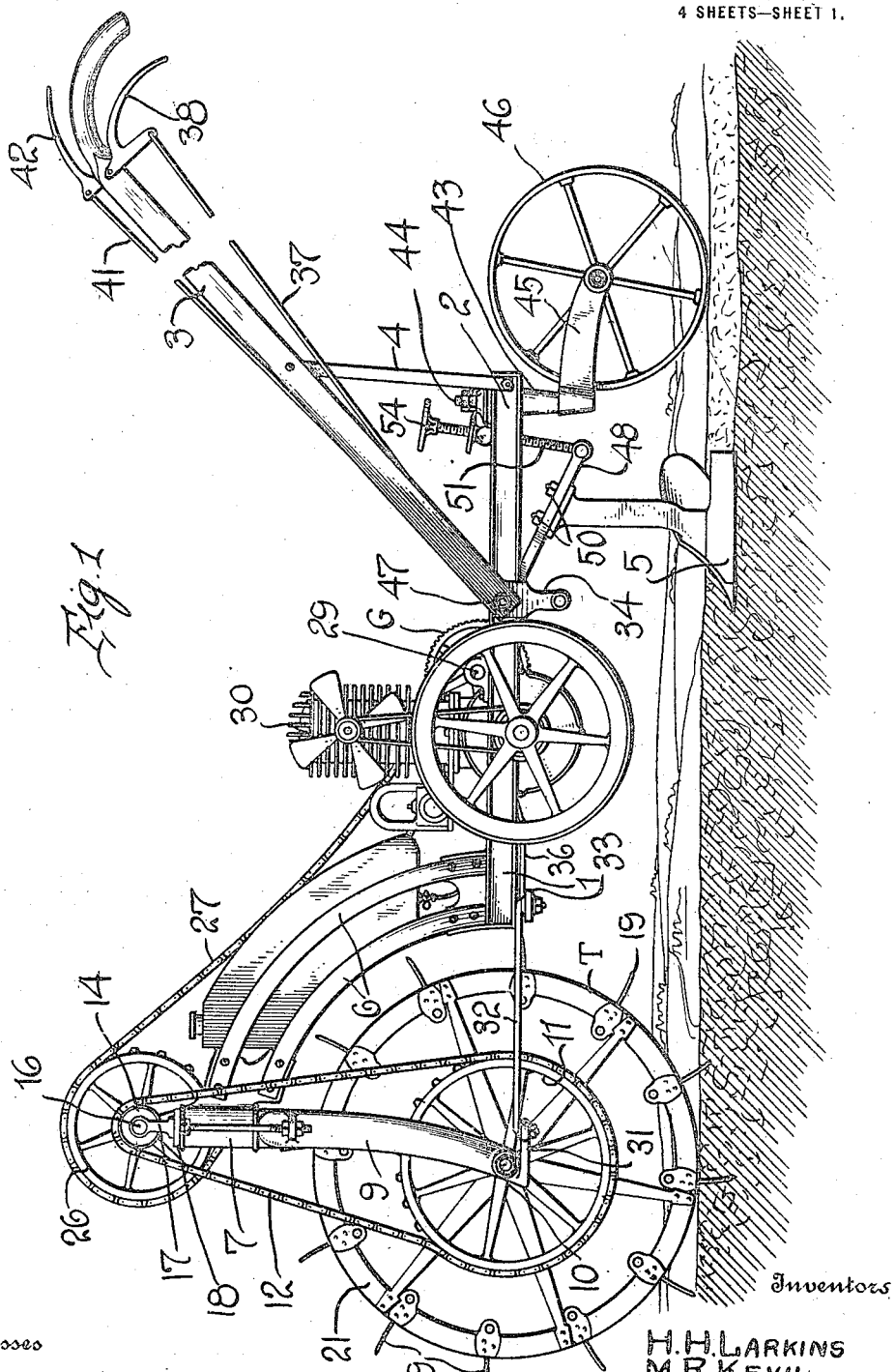

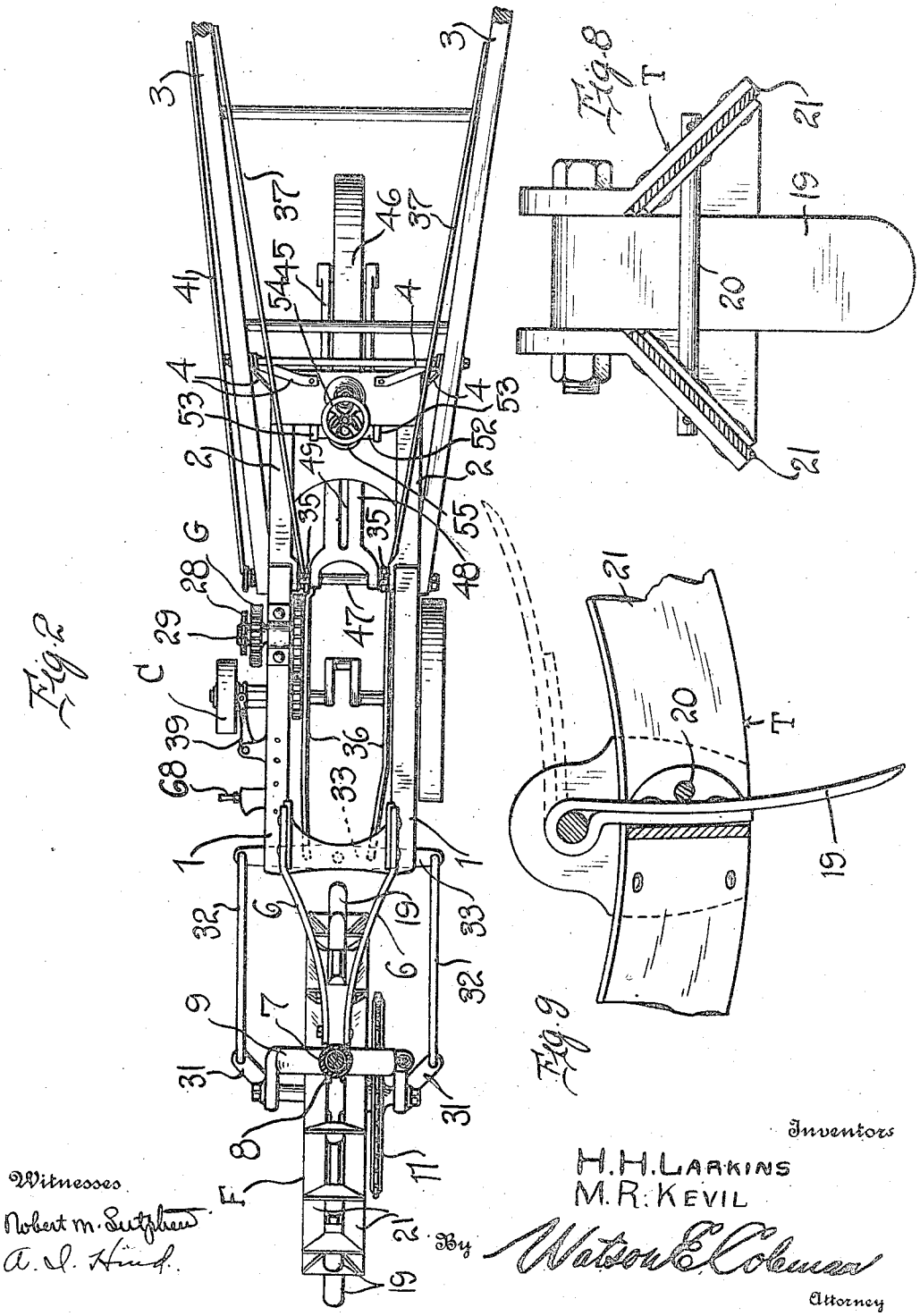

H. H. LARKINS & M. R. KEVIL.
AGRICULTURAL MACHINE.
APPLICATION FILED JAN. 6, 1915.
1,153,800.
Patented Sept. 14, 1915.
4 SHEETS—SHEET 3.
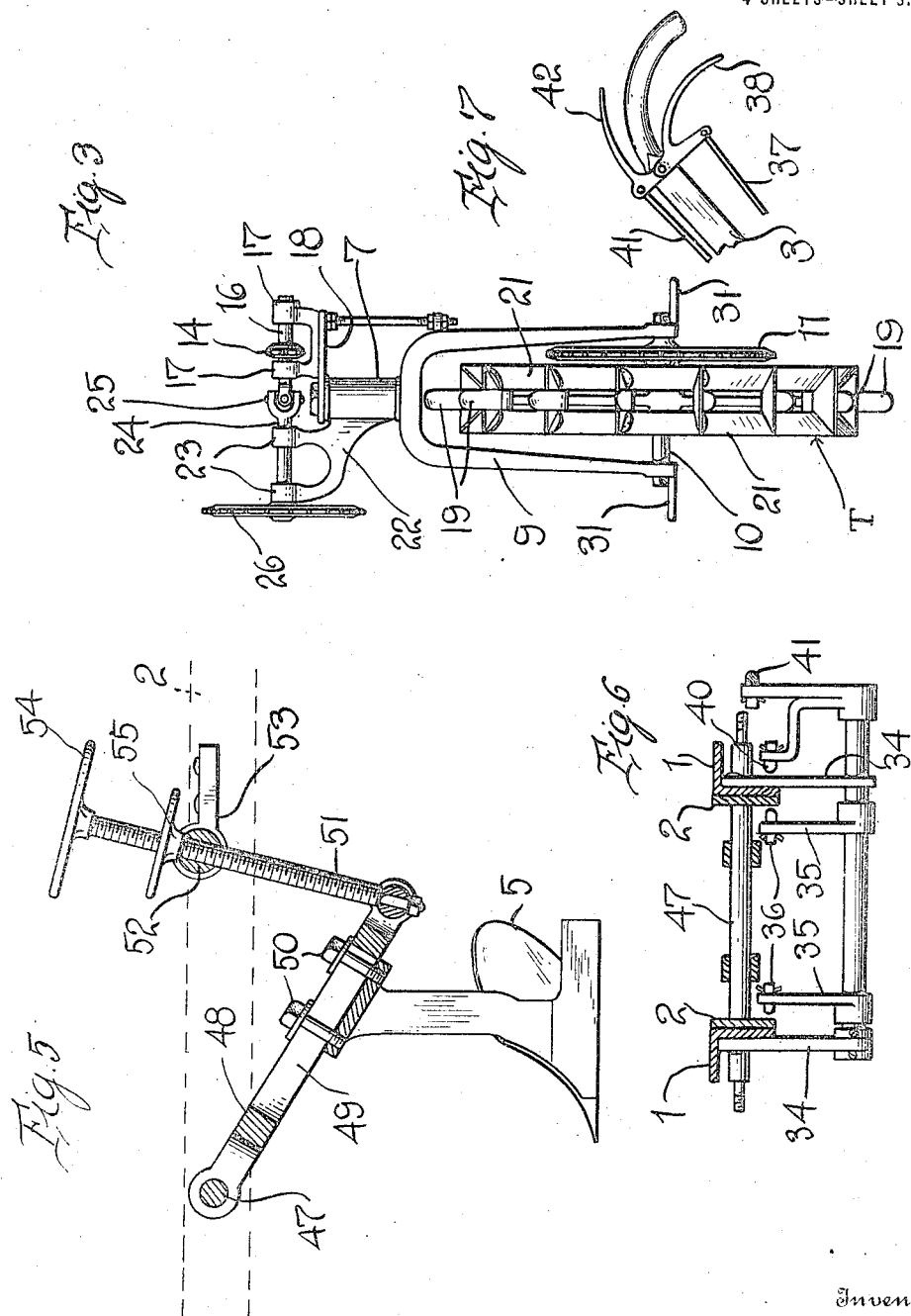
Witnesses
Robert M. Sutphen
A. L. Hind.
Inventors
H. H. LARKINS
M. R. KEVIL
By Watson E. Coleman
Attorney

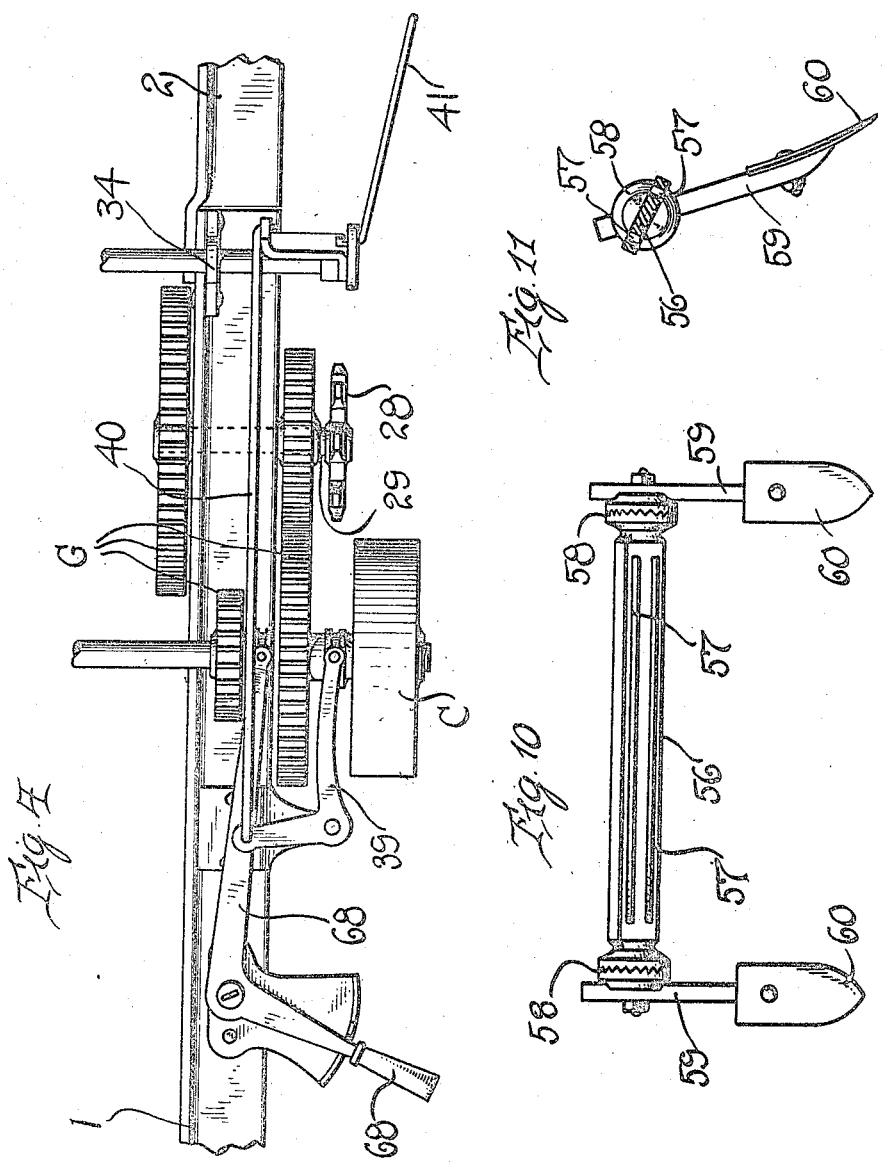

UNITED STATES PATENT OFFICE.

HERMAN H. LARKINS AND MANSON R. KEVIL, OF PRINCETON, KENTUCKY.

AGRICULTURAL MACHINE.

1,153,800.

Specification of Letters Patent.

Patented Sept. 14, 1915.

Application filed January 6, 1915. Serial No. 842.

*To all whom it may concern:*

Be it known that we, HERMAN H. LARKINS and MANSON R. KEVIL, citizens of the United States, residing at Princeton, in the county of Caldwell and State of Kentucky, have invented certain new and useful Improvements in Agricultural Machines, of which the following is a specification, reference being had to the accompanying drawings.

This invention relates to certain improvements in agricultural machines and has relation more particularly to a device of this general character especially designed and adapted to be transported through the medium of an operating motor carried thereby; and an object of the invention is to provide a device of this general character having novel and improved means whereby the control of the implement during transit may be effected with convenience and facility.

It is also an object of our invention to provide a novel and improved device of this general character wherein the drive wheel also serves as a medium whereby the direction of travel of the machine may be controlled.

Furthermore, it is an object of our invention to provide a novel and improved device of this general character including a frame comprising relatively movable sections whereby the section with which a ground engaging member is connected may be moved relatively to the ground independently of the remaining portion of the frame.

The invention consists in the details of construction and in the combination and arrangement of the several parts of my improved machine whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is a side elevational view of an agricultural machine constructed in accordance with an embodiment of our invention; Fig. 2 is a top plan view thereof, with parts in section; Fig. 3 is a front elevational view with the rear part omitted, for purposes of distinctness; Fig. 4 is an enlarged fragmentary view illustrating in detail the means for controlling the clutch transmission as herein embodied; Fig. 5 is an enlarged fragmentary view, partly in elevation and partly in section, illustrating the means for controlling the ground engaging implement; Fig. 6 is a transverse sectional view taken through the intermediate portion of the machine and illustrating certain details of construction; Fig. 7 is a fragmentary elevational view illustrating the means for controlling the steering mechanism and transmission as herein embodied; Fig. 8 is an enlarged fragmentary sectional view taken through the traction wheel as herein included; Fig. 9 is an enlarged fragmentary longitudinal section taken through the traction wheel, a second position of the claw therein included being indicated by dotted lines; Fig. 10 is an enlarged elevational view of a modified form of ground engaging implement adapted to be employed in connection with our improved machine; and Fig. 11 is a transverse sectional view taken through the intermediate portion of Fig. 10.

As disclosed in the accompanying drawings, 1 and 2 denote sections of the supporting frame of our improved device having their adjacent extremities pivotally connected by the transversely disposed shaft 47, and also operatively engaged with the shaft 47 are the lower extremities of the handles 3 disposed rearwardly and upwardly and maintained in proper position through the medium of the vertically disposed braces 4 operatively engaged with the handle members 3 and with the outer extremity of the section 2. By this arrangement, it will be readily perceived that upon lifting movement being exerted upon the handle members 3, the section 2 may be raised relative to the ground over which the same is traveling so that the ground engaging implement 5, herein indicated as a plow, may be elevated especially when it is desired to pass over an obstruction such as a stone or the like which may lie in the path of travel of the ground engaging member.

The forward extremity of the section 1 is provided with the upstanding curved brace bars 6 having their free extremities provided with the vertically disposed tubular head 7 in which is mounted for axial rotation the stem 8 of the fork 9. Mounted in the fork 9 is a shaft 10 to which is affixed the sprocket wheel 11 around which is directed a sprocket chain 12 also disposed around a sprocket wheel 14 fixed to a shaft 16 mounted in the spaced bearings 17 carried by the arm 18 disposed laterally from the upper extremity of the stem 8 whereby it will be perceived that such shaft 16 will be caused to move in unison with and in the same general direction as the fork so that the operative connection afforded by the chain 12 will be maintained irrespective of the adjustment of the fork 9. The shaft 10 has also affixed thereto the traction wheel T, herein disclosed as comprising two annular members 21 having positioned therebetween and pivotally engaged therewith the claws or blades 19, whereby said wheel T may be employed as a pulverizer. The claws or blades 19 are maintained in their projected position through the medium of the transverse pins 20 removably engaged with the sections 21 and which also serve to hold said claws or blades in a retracted position when it is desired to transport the machine from one place to another, as is believed to be clearly apparent to those skilled in the art to which my present invention appertains.

The head 7 is provided with a laterally disposed arm 22 provided with the bearings 23 in which is mounted a shaft 24 operatively engaged with the shaft 16 through the medium of a conventional universal joint, as indicated at 25, and said shaft 24 has fixed thereto a sprocket wheel 26 around which is directed a chain 27 also disposed around a sprocket 28 fixed to the driven shaft 29 disposed transversely of the section 1 and operatively engaged with the motor 30 of any ordinary construction but preferably of an internal combustion type, and operatively supported upon the section 1 as is believed to be clearly apparent in the accompanying drawings. The lower extremity of each of the tines of the fork 9 is provided with an inwardly disposed extension 31 with which is pivotally engaged a link 32 also pivotally engaged with an extremity of the transversely disposed rock arm 33 pivotally supported intermediate its length on the section 1 adjacent the forward extremity thereof and therebeneath whereby it will be perceived that upon the desired movement being imparted to the rock arm 33, the direction of travel of the device may be readily controlled.

Depending from the section 1 at opposite sides and at the inner end thereof are the arms 34 with which are pivotally engaged the upstanding levers 35, the upper or free extremities whereof being operatively engaged with the extremities of the rock arm 33 through the medium of the links 36, and each of said levers 35 has also in pivotal engagement therewith adjacent its free extremity a rod 37 disposed upwardly of one of the handle members 3 and operatively engaged with the lever 38 carried by the outer extremity of such handle member whereby it will be seen that upon proper manipulation of the lever 38 the fork 9 may be axially adjusted and thus control the direction of travel of the machine.

The motor 30, as hereinbefore stated, may be of any ordinary or preferred construction and includes a variable transmission gearing G of any desired construction which may be employed with facility and under control of the lever 68 projecting laterally from the section 1 and operating in a manner which is believed to be clearly apparent to those skilled in the art to which my present invention appertains. Also included in the motor 30 is a clutch mechanism C under control of the bell lever 39 with which coacts a link 40 operatively engaged with the rod 41 disposed upwardly of one of the handle members 3 and coacting with a second rock lever 42 whereby it will be perceived that the clutch may be readily and conveniently adjusted into or out of operative position when the requirements of practice may so require. Depending from the outer extremity of the section 2 is a thimble 43 through which is disposed the vertically directed stem 44 of the caster frame 45 operatively supporting the caster wheel 46 whereby it will be perceived that the rear portion of the device is effectively supported.

Pivotally engaged with the shaft 47 is a supporting bar 48 provided with an elongated longitudinally disposed slot 49 with which the ground engaging element 5 is adjustably engaged, as indicated at 50, while the lower or free extremity of the bar 48 is pivotally engaged with the lower extremity of a screw member 51 threaded through a member 52 rotatably supported in the brackets 53 carried by the outer extremity of the section 2. The upper extremity of the screw member 51 is provided with an operating means 54 whereby requisite axial rotation may be imparted to the member 51 in order to raise or lower the bar 48 so as to determine the extent of penetration of the ground engaging element 5. In order that the member 51 may be locked in its various adjustments, we employ the locking wheel 55 which operates in a manner which is believed to be self-evident.

While the ground engaging implement 5 is illustrated in the accompanying drawings as a plow, we wish it to be understood that when required the member 5 may be detached from the bar 48 and the transverse arm 56 be engaged therewith, said arm, as herein set forth, being provided with the longitudinally disposed slots 57 through which the engaging means 50 are directed. Each of the extremities of this latter bar 56 has adjustably engaged therewith, as indicated at 58, the shank 59 of a cultivator blade or shovel 60.

From the foregoing description, it is thought to be obvious that an agricultural machine constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:—

1. A device of the character described comprising two sections, a shaft for pivotally engaging the sections whereby the same may be moved one relative to the other, means carried by one of the sections for imparting relative movement thereto, a bar pivotally engaged with the shaft, means carried by the last named section and coacting with the bar for adjusting the same around the shaft, and a member adjustable longitudinally of the bar.

2. A device of the character described comprising a frame, a tubular head carried thereby, a fork provided with a stem disposed through said head, a wheel supported by the fork, a lateral extension carried by the stem provided with bearings, a shaft rotatably supported in the bearings, an operative connection between the shaft and the wheel, an arm projecting laterally from the head and provided with bearings, a second shaft mounted in the bearings of the arm and having a universal joint with the first named shaft, and means for imparting axial rotation to the second named shaft.

3. A device of the character described including a supporting frame comprising hingedly connected sections, a steering wheel carried by one of the sections, handle members carried by a second section, and means coacting with said handle members for controlling the steering wheel.

4. A device of the character described including a supporting frame comprising hingedly connected sections, a steering wheel carried by one of the sections, handle members carried by a second section, endwise movable members carried by the handle members, and an operative connection between each of the endwise movable members and the steering wheel for controlling the movement of the steering wheel.

In testimony whereof we hereunto affix our signatures in the presence of two witnesses.

HERMAN H. LAR......
MANSON R. KEV......

Witnesses:
  JAMES G. DOLLAR,
  CLYDE C. JOHNSON.

Copies of this patent may be obtained for five cents each, by addressing the "Commissioner of Patents, Washington, D. C."